US011880707B2

(12) United States Patent
Twohig et al.

(10) Patent No.: US 11,880,707 B2
(45) Date of Patent: Jan. 23, 2024

(54) MODELING, PERSISTING, AND PRESENTING JOB REPORTS IN A STORAGE SYSTEM MANAGEMENT APPLICATION

(71) Applicant: EMC IP HOLDING COMPANY LLC, Hopkinton, MA (US)

(72) Inventors: Aaron Twohig, Rathpeacon (IE); Fearghal O'Maolcatha, Midleton (IE)

(73) Assignee: Dell Products, L.P., Hopkinton, MA (US)

( * ) Notice: Subject to any disclaimer, the term of this patent is extended or adjusted under 35 U.S.C. 154(b) by 343 days.

(21) Appl. No.: 17/236,024

(22) Filed: Apr. 21, 2021

(65) Prior Publication Data
US 2022/0342695 A1    Oct. 27, 2022

(51) Int. Cl.
| G06F 9/48 | (2006.01) |
| G06F 40/143 | (2020.01) |
| G06F 40/146 | (2020.01) |
| G06F 9/50 | (2006.01) |

(52) U.S. Cl.
CPC .............. *G06F 9/485* (2013.01); *G06F 9/505* (2013.01); *G06F 40/143* (2020.01); *G06F 40/146* (2020.01)

(58) Field of Classification Search
CPC ....... G06F 9/485; G06F 40/146; G06F 40/143
USPC ....................................................... 718/100
See application file for complete search history.

(56) References Cited

U.S. PATENT DOCUMENTS

| 7,266,821 B2 * | 9/2007 | Polizzi ................. G06F 16/958 709/201 |
| 7,383,546 B1 * | 6/2008 | Ramamurthi ........... G06F 9/485 718/100 |
| 7,640,496 B1 * | 12/2009 | Chaulk ............... H04L 67/1097 715/204 |
| 7,827,476 B1 * | 11/2010 | Roberts ............... H04L 67/1097 715/204 |

(Continued)

OTHER PUBLICATIONS

Ferguson, R. (2019). JavaScript and Application Frameworks: Angular. In: Beginning JavaScript. Apress, Berkeley, CA. (Year: 2019).*

(Continued)

*Primary Examiner* — Thu V Huynh
*Assistant Examiner* — James H. Blackwell
(74) *Attorney, Agent, or Firm* — Anderson Gorecki LLP

(57) ABSTRACT

Job report objects (Java objects) are created by task executors in connection with implementation of a job on a storage system. The Java objects are passed to a job report service that converts the Java objects into XML objects using an XML encoder/decoder. The XML objects are persisted by the job report service as text in a database. If a job report is requested, the job report service retrieves a job record for the corresponding report from the database, creates Java objects, and passes the Java objects to a storage system management client. The client creates an internal model of the report containing a corresponding set of strongly typed TypeScript objects. The TypeScript objects are passed to a pdf data exporter that converts the internal TypeScript objects into untyped JavaScript objects. The untyped JavaScript objects are input to a .pdf generator which generates the requested report as a .pdf document.

10 Claims, 11 Drawing Sheets

(56) References Cited

U.S. PATENT DOCUMENTS

| | | | | |
|---|---|---|---|---|
| 2003/0110446 A1* | 6/2003 | Nemer | ................... | G06F 8/10 |
| | | | | 715/239 |
| 2004/0221233 A1* | 11/2004 | Thielen | ................ | G06F 40/186 |
| | | | | 715/234 |
| 2008/0163219 A1* | 7/2008 | Marwinski | ............ | G06F 9/4881 |
| | | | | 718/101 |
| 2016/0048480 A1* | 2/2016 | Chan | ................... | G06F 40/186 |
| | | | | 715/234 |
| 2016/0179573 A1* | 6/2016 | Kneisel | .................. | G06F 9/485 |
| | | | | 718/101 |
| 2017/0118094 A1* | 4/2017 | Rao | ................... | H04L 63/083 |

OTHER PUBLICATIONS

Habarta, Vojtech, "Typescript-Generator," archived Jun. 11, 2018, Wayback Machine, 8 pages. (Year: 2018).*

* cited by examiner

FIG. 4
Job Definition

| Job Type 400 | Task 1 $310_1$ | Task Executor $320_1$ | Report Yes/no $420_1$ | Report Object(s) $340_1$ |
|---|---|---|---|---|
| | Task 1 $310_2$ | Task Executor $320_2$ | Report Yes/no $420_1$ | Report Object(s) $340_2$ |
| | ● ● ● | ● ● ● | ● ● ● | ● ● ● |
| | Task 1 $310_n$ | Task Executor $320_n$ | Report Yes/no $420_1$ | Report Object(s) $340_n$ |
| Report Model 900 | | | | |

FIG. 8

Modify Subnet Task Execution Details

Impacted Interfaces

| NAS Server | Interface | Current Preferred | IP Address | SubnetMask | Update |
|---|---|---|---|---|---|
| nasServer0 | PROD008_18234343_14 | false | 192.168.15.10 | 225.225.248.0 | true |
| nasServer1 | PROD008_18239898_15 | true | 192.168.15.15 | 225.225.248.0 | true |

MODELING, PERSISTING, AND PRESENTING JOB REPORTS IN A STORAGE SYSTEM MANAGEMENT APPLICATION

FIELD

This disclosure relates to computing systems and related devices and methods, and, more particularly, to a method and apparatus for modeling, persisting, and presenting job reports in a storage system management application.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Job report objects (Java objects) are created by task executors in connection with implementation of a job on a storage system. The Java objects are passed to a job report service that converts the Java objects into XML objects using an XML encoder/decoder. The XML objects are persisted by the job report service as text in a database. If a job report is requested, the job report service retrieves a job record for the corresponding report from the database, creates Java objects from the persisted text using the XML encoder/decoder, and passes the Java objects of the job record to a storage system management client. The client creates an internal model of the report containing a corresponding set of strongly typed TypeScript objects. The TypeScript objects are passed to a portable document format (.pdf) data exporter that converts the internal TypeScript objects into untyped JavaScript objects. The untyped JavaScript objects are input to a .pdf generator which generates the requested report as a .pdf document. Other types of documents, such as word documents or excel spreadsheets, may be created in a similar manner.

BRIEF DESCRIPTION OF THE DRAWINGS

FIG. 4 is a data structure configured to implement a job definition, according to some embodiments.

FIG. 8 is an example job report implemented as a .pdf document, generated on demand from job report data, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
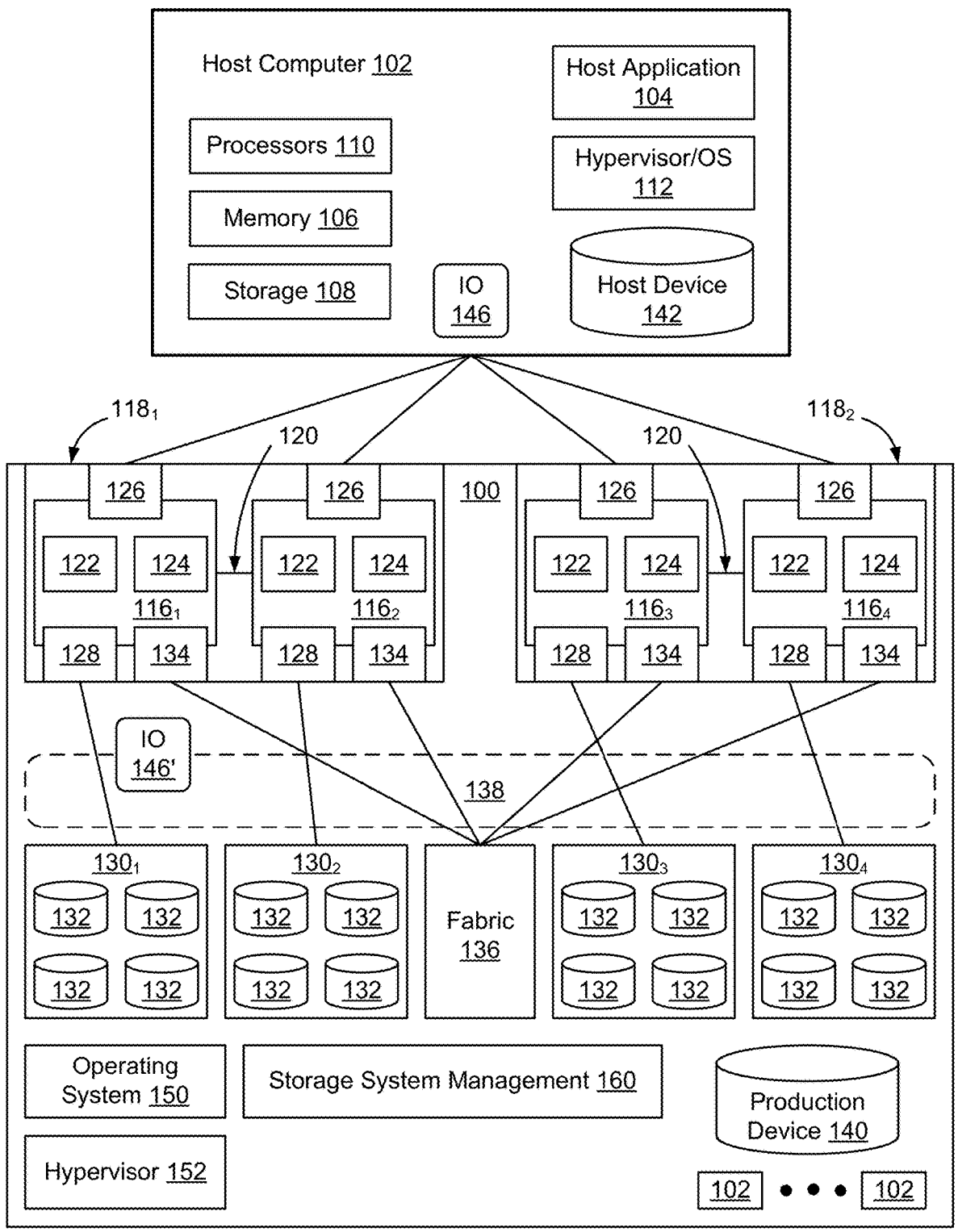
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140 (zoning).

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. The host computer 102 can then execute read/write IOs on the Tdev to access the data of the production device.

As shown in FIG. 1, in some embodiments a storage system management application 160 is used to manage the storage system 100. The storage system management application 160 uses the concept of a "job" to model and schedule management operations. As an example, a job may be created through the storage system management application 160 to provision new storage on the storage system 100 for an application 104. As another example, a job may be created to establish protection for a volume of data, such as to have a particular volume of data mirrored to another storage system on a reproduction data facility or to have point in time copies (snapshots) of the particular volume created according to a desired cadence. There are many types of jobs that may be submitted for execution on a storage system to control the particular manner in which the storage system is configured to operate.

Figure 2:
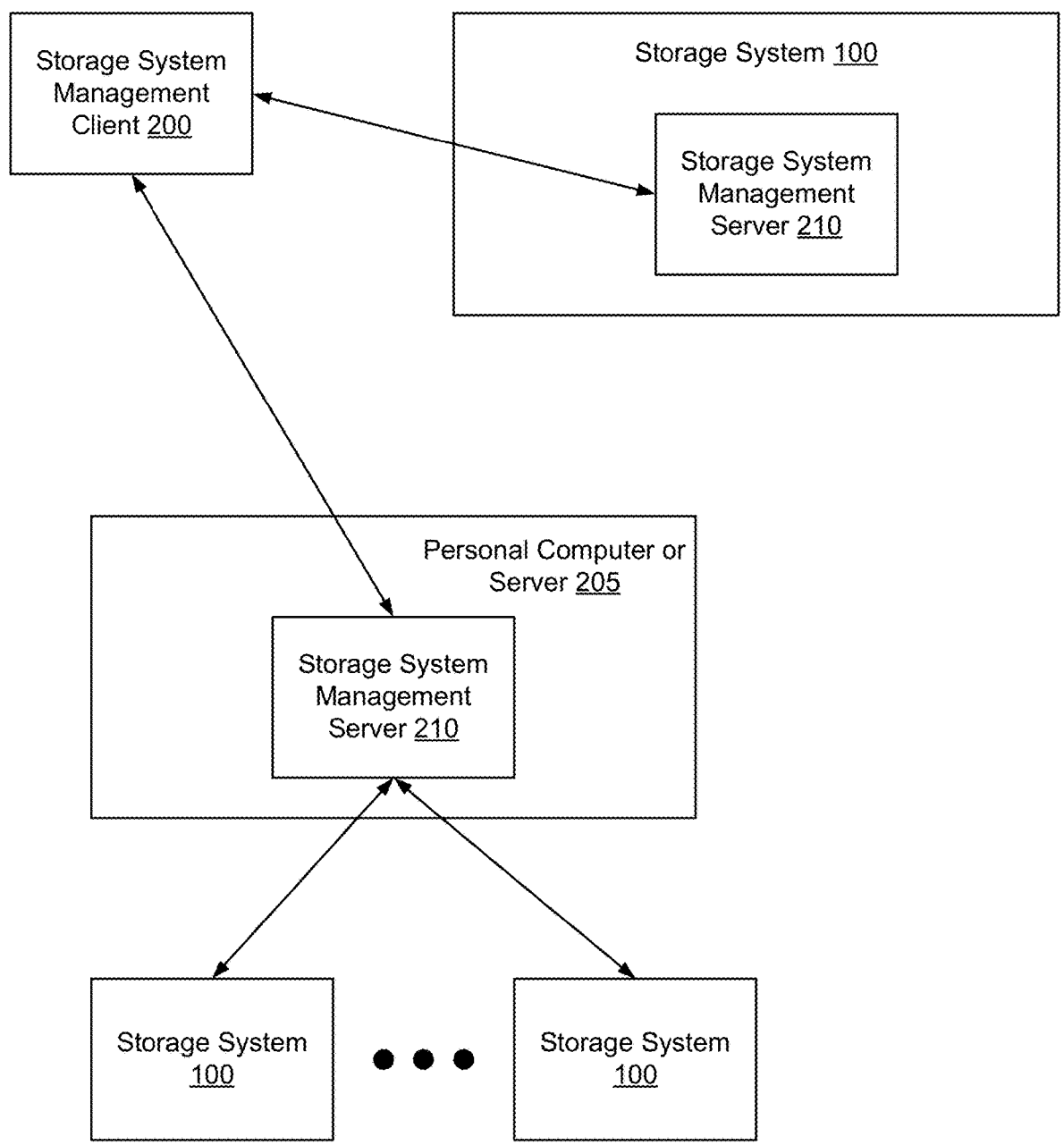
FIG. 2 is a functional block diagram of a storage system management environment, including a storage system management client and one or more storage system management servers, according to some embodiments.

FIG. 2 is a functional block diagram of a storage system management environment, including a storage system management client 200 and one or more storage system management servers 210, according to some embodiments. As shown in FIG. 2, in some embodiments a storage system management client 200 is implemented, for example on a host computer 102, and is configured to create jobs on one or more storage system management servers 210. The storage system management servers 210 execute the jobs on storage systems 100 to control the services provided by storage systems 100. As shown in FIG. 2, a storage system management server 210 may execute within storage system 100, for example in an emulation instantiated on storage system 100, and control execution of jobs on that particular storage system. Alternatively, a storage system management server 210 may execute external to storage system 100 and control execution of the jobs on one or more storage systems 100. There are many ways of configuring a storage system management environment depending on the implementation.

Figure 3:
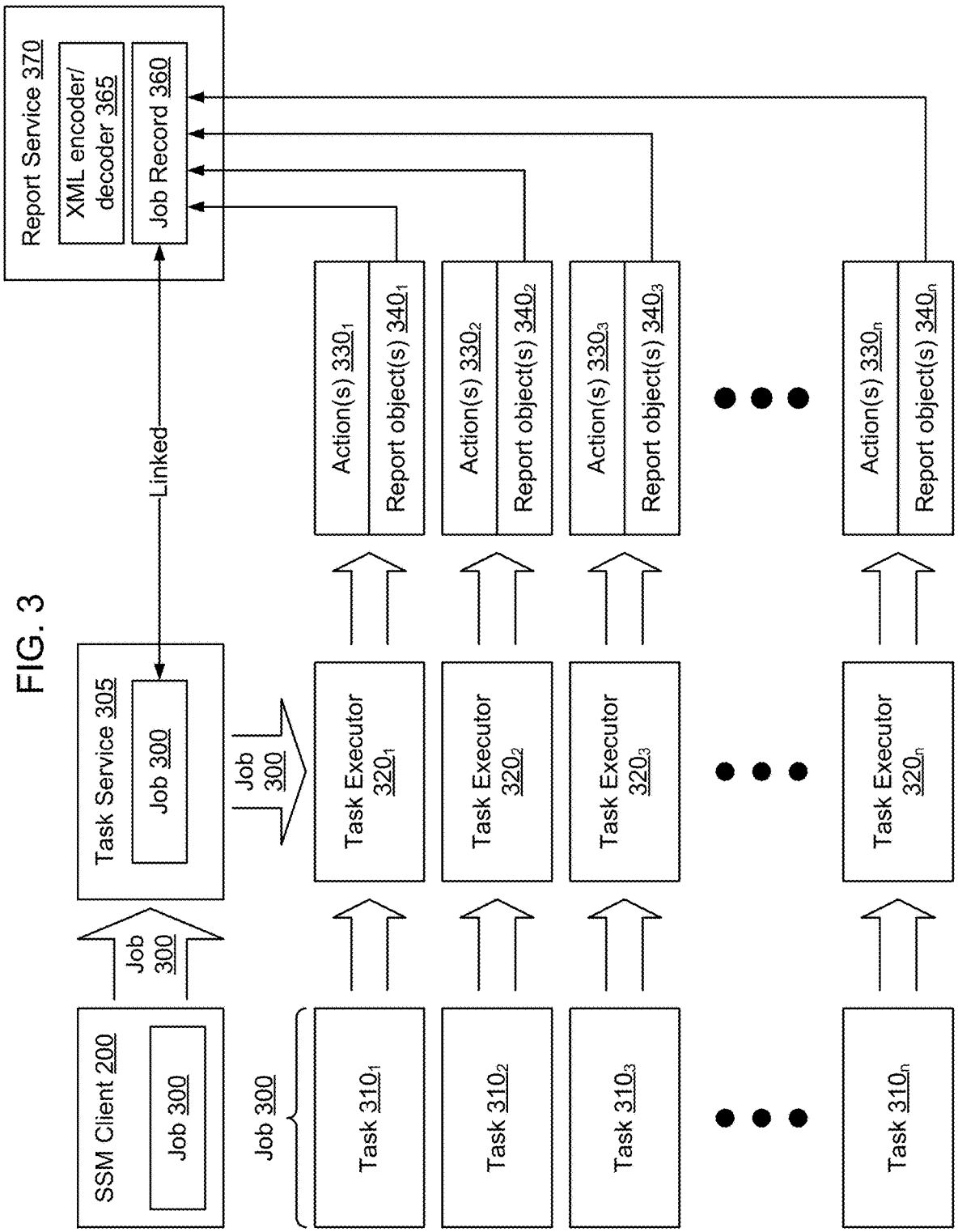
FIG. 3 is a functional block diagram showing execution of a complex job on a storage system, according to some embodiments.

FIG. 3 is a functional block diagram showing execution of a complex job on a storage system, according to some embodiments. As shown in FIG. 3, in some embodiments the storage system management client 200 is used to create a job 300 that is passed to a task service 305 on the storage system management server 210. The task service 305 is responsible for persisting, scheduling, and executing the job on the storage system 100. A user can check the status of the job 300 by viewing the job status on a task list at the task service 305.

Figure 7:
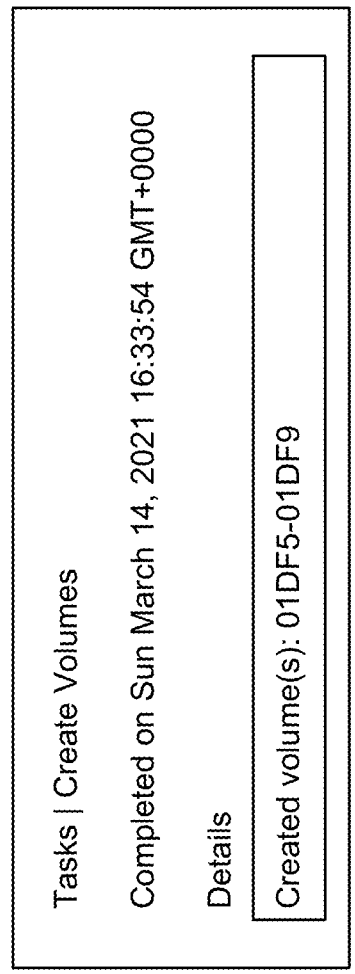
FIG. 7 is an example display of a simple job result that may be presented, for example, via a command line interface or on a graphical user interface, according to some embodiments.

When a job is completed, the result of the job is sometimes easy to display. For example, if a job is submitted to the task service 305 to instruct the task service 305 to create a set of storage volumes, once the storage volumes have been created the task service can provide a simple status update, for example as shown in FIG. 7, that volumes 01DF5-01DF9 have been created. Other jobs, however, require significant additional details to present the user with a full understanding of the result of the job. For example, as shown in FIG. 8, there are times when the result of a job are large and complex, and it would be advantageous to be able to create documents that organize the job results in a coordinated and consistent manner, for example in the form of one or more tables.

According to some embodiments, a task service 305 implements jobs on a storage system using task executors 320. The task executors 320 are responsible for taking particular actions 330 on the storage system 100 and, as part of task execution, are responsible for creation of job report objects 340. The job report objects 340 may be implemented, for example, as Java objects. The job report objects 340 are passed to a report service 370, which uses an XML encoder/decoder 365 to create corresponding XML objects that are stored in text form as a job record 360 in a database. The job report data of the job record 360 is not formatted into a job report while persisted at the job report service 370. In some embodiments, the job report objects 340 of the job record 360 are encoded into XML and persisted in plain text by the report service 370.

If a user would like to be provided with a job report document, the user initiates creation of a job report document from the job record 360, for example through a task list maintained by the task service 305. The job report objects 340 of the job record 360 are then used in connection with a job report model (see FIG. 9) to create a job report document. An example job report document is shown in FIG. 8. Job report documents may be implemented as .pdf documents, excel documents, word documents, or other types of documents depending on the implementation. FIG. 10 shows an example process of retrieving persisted job report objects 340 of a job record 360, and converting the job report information into a job report document on demand, according to some embodiments.

Since job report documents are created on demand from collections of job report objects 340 of a job records 360, it is possible to generate different types of job report documents from the same job records 360. Additionally, if it is desired to create differently formatted job report documents, it is possible to adjust the job report model and re-create the job report documents, to thereby modify the type of information that is presented in the job report document or the format and organization of the job report document.

Additionally, since the job report objects 340 are persisted in text at the job report service, the amount of storage required to store the job records 360 is significantly less than the amount of storage that would be required if the job report service were to create and store actual job report documents. Further, because the job report objects are persisted as text, it is possible to run search algorithms on the job report objects more easily than would be possible if the job report service 370 created and stored the job report documents, for example as .pdf documents.

As shown in FIG. 3, in some embodiments the storage system management client 200 creates a job 300 that is passed to a task service 305 executing, for example, on a storage system management server 210. The storage system management server 210 also includes a report service 370 that is configured to persist collections of job report objects 340 (job report data) as job records 360.

In some embodiments, the task service 305 breaks a job into tasks 310 that are implemented on the storage system 100 using task executors 320. For example, in FIG. 3 the job 300 has been broken into tasks $310_1$-$301_n$, which are implemented on the storage system by task executors $320_1$-$320_n$. When the task executors are created, for example by a developer, the task executor is designed not only to implement the particular task on the storage system, but also to generate one or more job report objects identifying the type of task that was implemented and the result of the task. In some embodiments, the job report objects are implemented using Java classes in the server.

The job report objects are passed to the report service 370 which uses an XML encoder/decoder 365 to convert the job report objects into XML. The XML objects are stored in text form in a database at the job report service 370. A collection of job report objects from a set of tasks that execute to implement a job is stored as a job record 360 at the report service 370.

FIG. 4 is a data structure configured to implement a job definition, according to some embodiments. As shown in FIG. 4, the job definition in some embodiments includes a job type 400. The job type 400, in some embodiments, specifies a job report model 900 (see FIG. 9) of the job report. The job report model 900 specifies the type of objects that should be included in the job report. Example objects may include a job report header, content list, sections, tables, column, and row objects which, in some embodiments, are modeled as Java classes. The job definition also includes a list of entries, each of which includes a task identifier 310, the identity of a task executor 320, an indication of whether the task executor should generate one or more report objects 420, and the type of report objects 340 to be generated by the task executor 320. Additional information may be contained in the job definition entries depending on the implementation.

The job definition is submitted to the task service 305, and used by the task service 305 to implement the job. As jobs are executed by the task service 305, the status of the jobs is maintained in a task list. If execution of the tasks associated with a job generate job report objects 340, the job report objects 340 are transmitted to the job report service 370 and are persisted by the job report service 370 as a job record 360.

Figure 5:
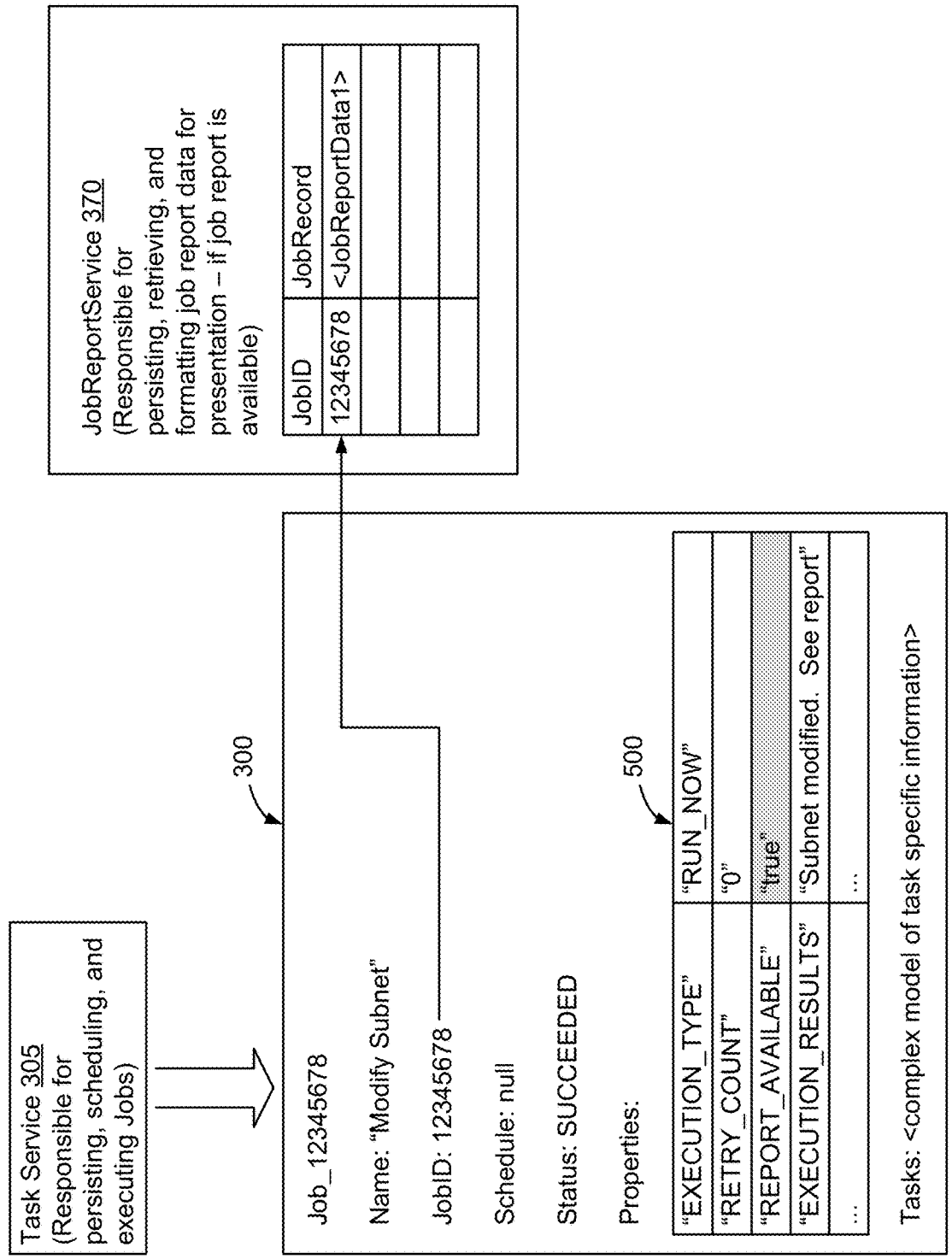
FIGS. 5 and 6 are a functional block diagrams of example job definitions in a task service and job report data persisted in a job report service, according to some embodiments.
Figure 6:
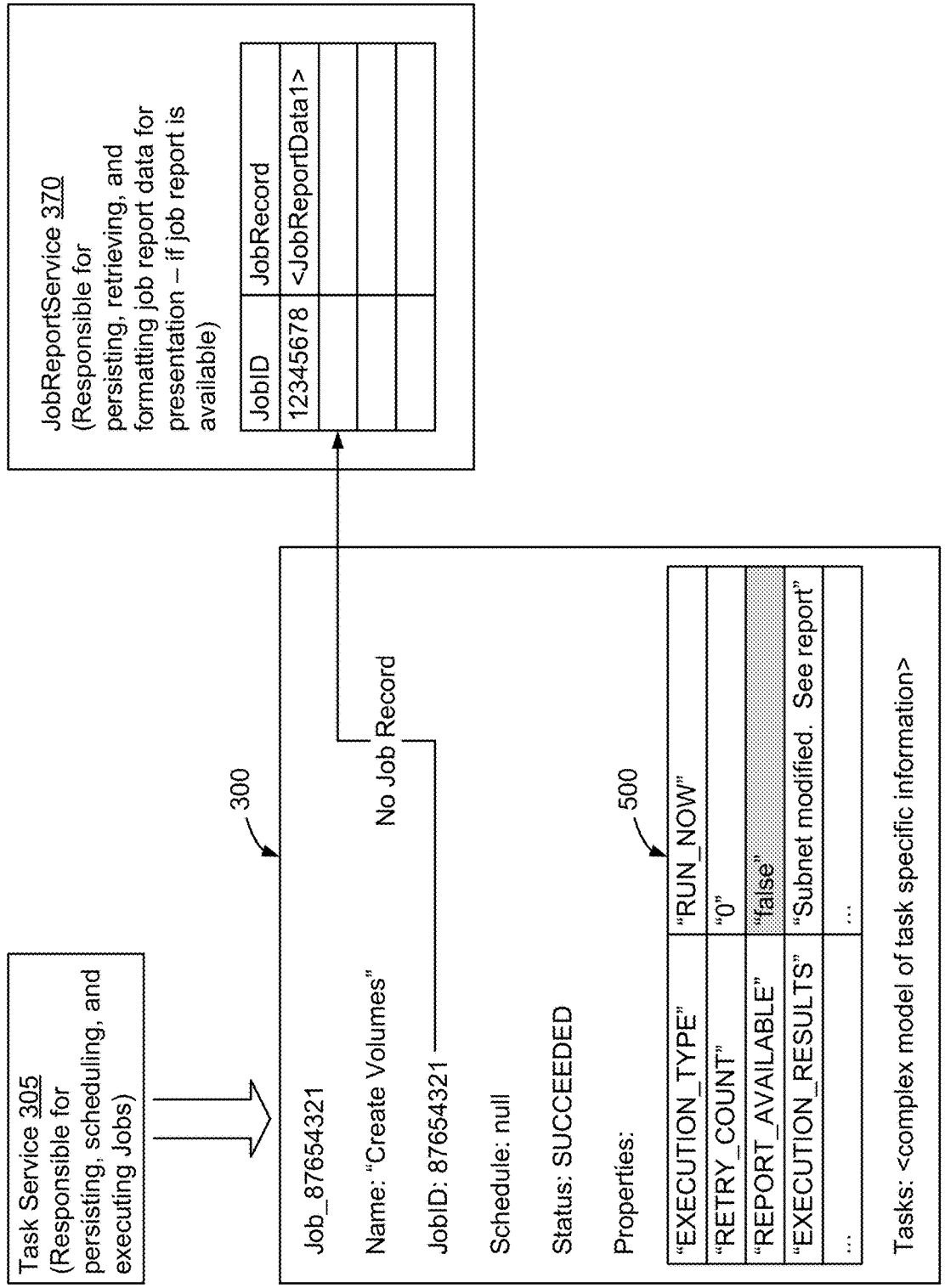

FIGS. 5 and 6 are functional block diagrams of two example jobs that may be viewed by selecting a corresponding entry in a task list of a task service 305. In the example shown in FIG. 5, JobID:12345678 has a property "Report_Available:true". Accordingly, when the job is executed, a job record 360 will be created and exist at the job report service 370 under the JobID:12345678 for the job shown in FIG. 5. By contrast, in the example shown in FIG. 6, JobID:87654321 has the property "Report_Available:false". Accordingly, a job record 360 will not be created at the job report service 370 for the job shown in FIG. 6. Note in FIG. 6 that the job report service 370 does not have a job record for JobID:87654321.

In some embodiments, the JobID is an existing identifier guaranteed to be unique across all jobs on task service 305, including those upgraded from a previous version of the system. The same JobID is used at the job report service 370 to enable job records to be identified at the job report service 370 using the JobID used by the task service 305. Instead of inserting the report into the job structure at the task service 305, a property-value pair is inserted into an existing property map 500 within the job 300. In some embodiments a string-to-string mapping is used, such that no new metadata is required, which enables backward compatibility to be maintained. New reports can be attached to legacy jobs if necessary. By separating the job reports from the jobs in the task service 305, it is possible for reports to be retrieved independently and on demand, which improves performance when transporting collections of jobs from the storage system management server 210 to the storage system management client 200. Specifically, the storage system management client 200 can view the task list of the task service 305, and view jobs 300, without downloading a potentially large report for each of the jobs listed on the task list. Thus, the system does not consume bandwidth creating and transporting potentially large job reports that the user may not be interested in receiving or viewing.

FIG. 7 is an example display of a simple job result that may be presented, for example, via a command line interface or on a graphical user interface on storage system management client 200, according to some embodiments. FIG. 8 is an example job report document, generated on demand from an example job record 360, according to some embodiments. As is clear from FIG. 8, job report documents are able to have a relatively complex layout, including a header such as the title of the job report, a content list, various sections, and tables defined by table, column, and row objects. An implementation will be described in connection with using the job report objects 340 of a job record 360 to create a .pdf document, but the same process can be used to create other types of documents such as word documents or excel documents as well.

Figure 9:
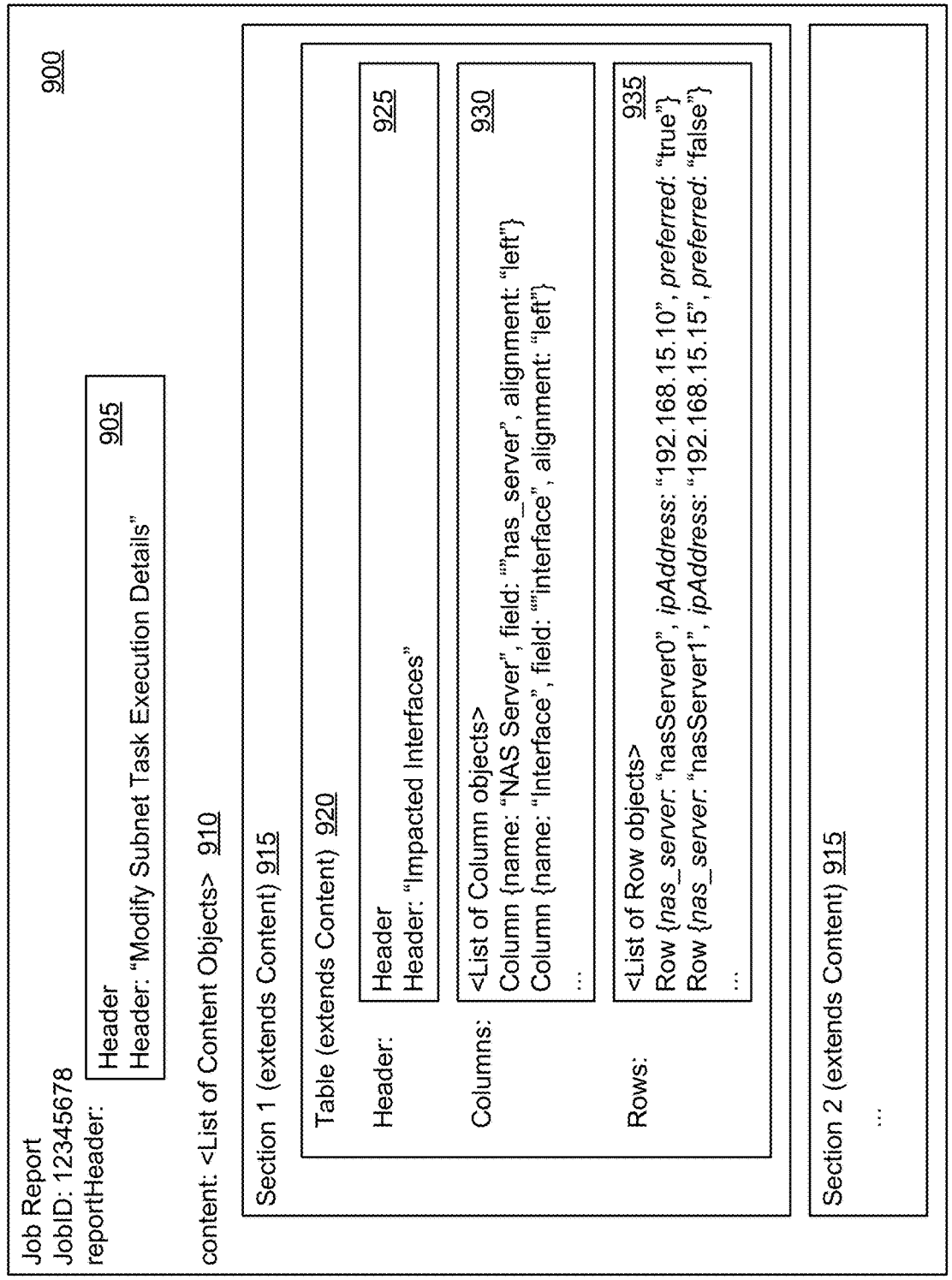
FIG. 9 is a functional block diagram of an example job report model, that may be used to generate a job report such as the job report of FIG. 8, according to some embodiments.
Figure 10:
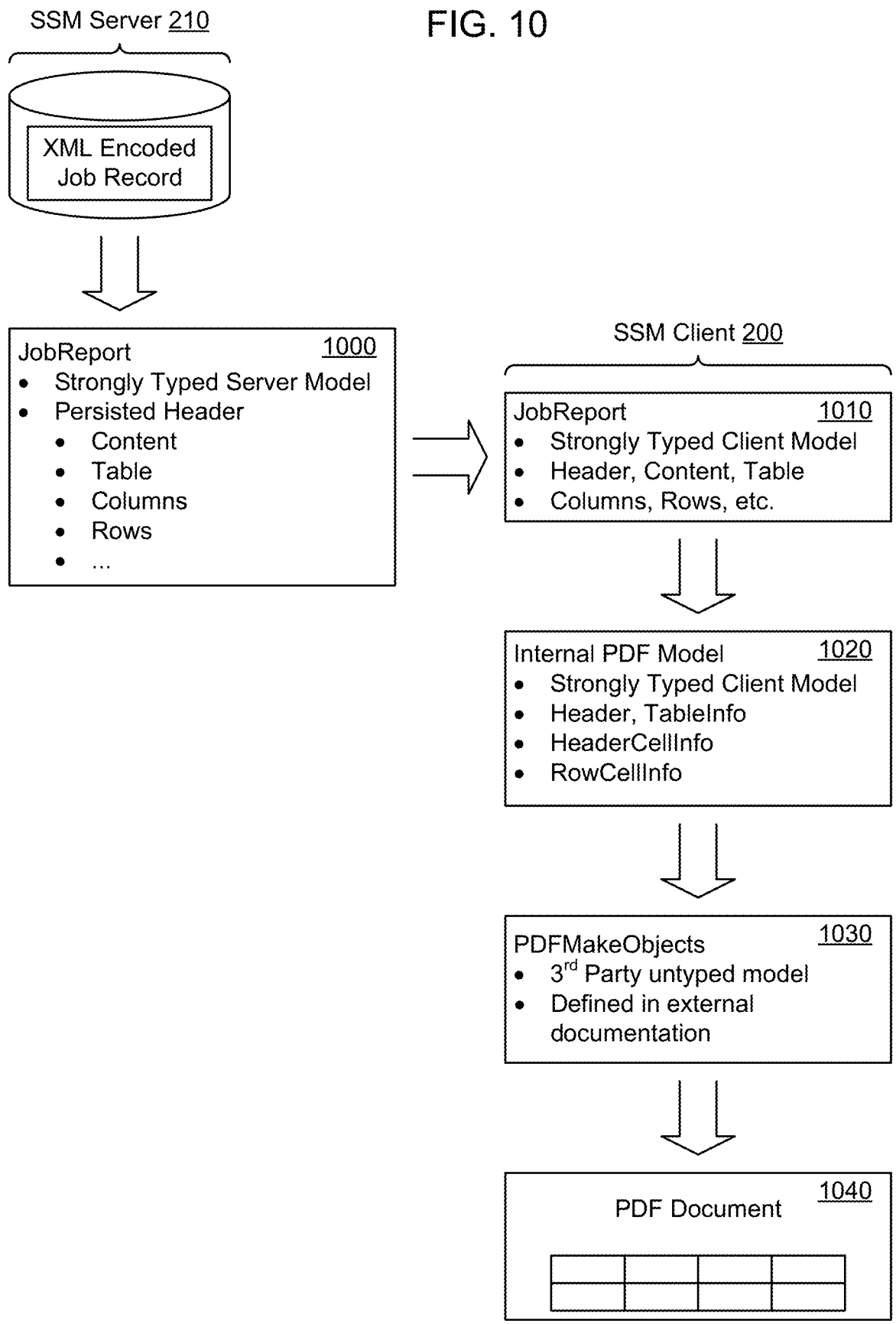
FIG. 10 is a flow diagram illustrating a process of persisting job records containing job report data, and creating job reports from the job report data on demand, according to some embodiments.

FIG. 9 is a functional block diagram of an example job report model 900, that may be used to generate a job report such as the job report of FIG. 8, according to some embodiments. The particular job report model will depend on the type of job to be executed by task service and the desired layout of the corresponding job report document to be created after completion of the job on the storage system. In some embodiments, the job report model 900 is implemented as a job report object that is transmitted from the task service 305 to the job report service 370 when the job is implemented by the task service 305 on the storage system 100.

In the example job report model 900 shown in FIG. 9, the job report model 900 includes a report header object 905, a content list object 910 which is used to provide a list of the content objects, and several section objects 915. Section object #1 includes a table object 920. The table object includes a table header object 925, a list of column objects 930, and a list of row objects 935. The column objects specify the type and order of information to be displayed in the table. The row objects are objects that are to be populated by information from the row objects 340, that are generated by the task executors 320 in connection with implementing the actions on the storage system when the job is executed. In some embodiments the objects are based on Java classes.

FIG. 10 is a flow diagram illustrating a process of persisting job records containing job report data, and creating job report documents from the job report objects on demand, according to some embodiments. As shown in FIG. 10, the report service 370 receives job report objects 340 (Java objects) and uses an XML encoder/decoder to create a corresponding set of XML objects. In some embodiments, the job report service persists job records 360 as Java beans, using Java Enterprise Edition (JEE) XML encoder/decoder. This allows the job report objects to be stored as text. Accordingly, the database that the report service uses to store the job records does not need to be configured to store large binary objects and does not need new tables to be created to match the job report structure.

When a job report document is to be created, the storage system management server retrieves the XML and uses the XML to create a set of Java objects forming a Job Report 1000. Accordingly, although persisted as XML, the XML is subsequently used to recreate the original Java objects which are then passed to the storage system management client. The storage system management client 200 retrieves the Java objects 1000 of the job record 360 from the report service 370. In some embodiments, the job report 1000 is implemented at the report service 370 using a strongly typed server model 900, which includes a collection of objects such as a header objects, content objects, table, column, and row objects.

When the storage system management client 200 retrieves the data, it stores the data as a job report data 1010. The job report data 1010, at that point, is not suitable for display. The storage system management client 200 uses the job report data 1010 to create a set of job report objects 1020. For example, in an implementation where the job report document that is to be created is a .pdf document, the storage system management client uses the job report data 1010 to create an internal .pdf model 1020 of the job report document. The internal .pdf model includes a set of strongly typed TypeScript objects (.pdf objects) that are created from the job report data 1010. The TypeScript objects are passed to a .pdf data exporter that converts the internal TypeScript objects into untyped JavaScript objects 1030. The untyped JavaScript objects are passed to a .pdf document generator 1030, which creates the .pdf document 1040.

In the implementation shown in FIG. 10, the .pdf document generator is pdfMake, which is an open source .pdf document generator that accepts, as input, untyped JavaScript objects. It should be understood that other .pdf document generators can be used as well. By creating an internal .pdf model, it is possible to use different .pdf document generators to create .pdf documents 1040 forming the job reports that are presented to the user.

The pdfMake imputs are defined in the form of untyped JavaScript objects. The required object structures ("docDefinition") are defined in the pdfMake documentation, but not enforced at compile time. To minimize the risk of run-time errors, and to support portability to other pdf generators, in some embodiments a strongly typed TypeScript model of the .pdf structures is used to create the objects of the internal .pdf model 1020. In some embodiments, the structures include TableInfo, HeaderCellInfo, CellInfo, and RowCellInfo. The job report service is used to convert the server-side Job Report objects into these client-side .pdf report model 1020. The objects of the internal .pdf model 1020 are then converted into the untyped JavaScript objects that are input to the pdfMake library 1030.

According to some embodiments, the process of creating a .pdf document is a five-step process. First, the storage system management server retrieves the XML encoded job record 360 from the report service 370 database. The server uses the XML to generate Java Objects of a Job Report 1000 which is returned to the storage system management client 200. The storage system management client 200 converts the job report into an internal .pdf model 1020 containing strongly typed TypeScript objects. The storage system management client then uses the internal .pdf model 1020 to create the JavaScript objects to be input to the .pdf generator 1030. The .pdf generator uses the JavaScript objects to create the .pdf document 1040. The .pdf document 1040 is a normal document that can be downloaded, viewed, stored, etc., by a user.

Figure 11:
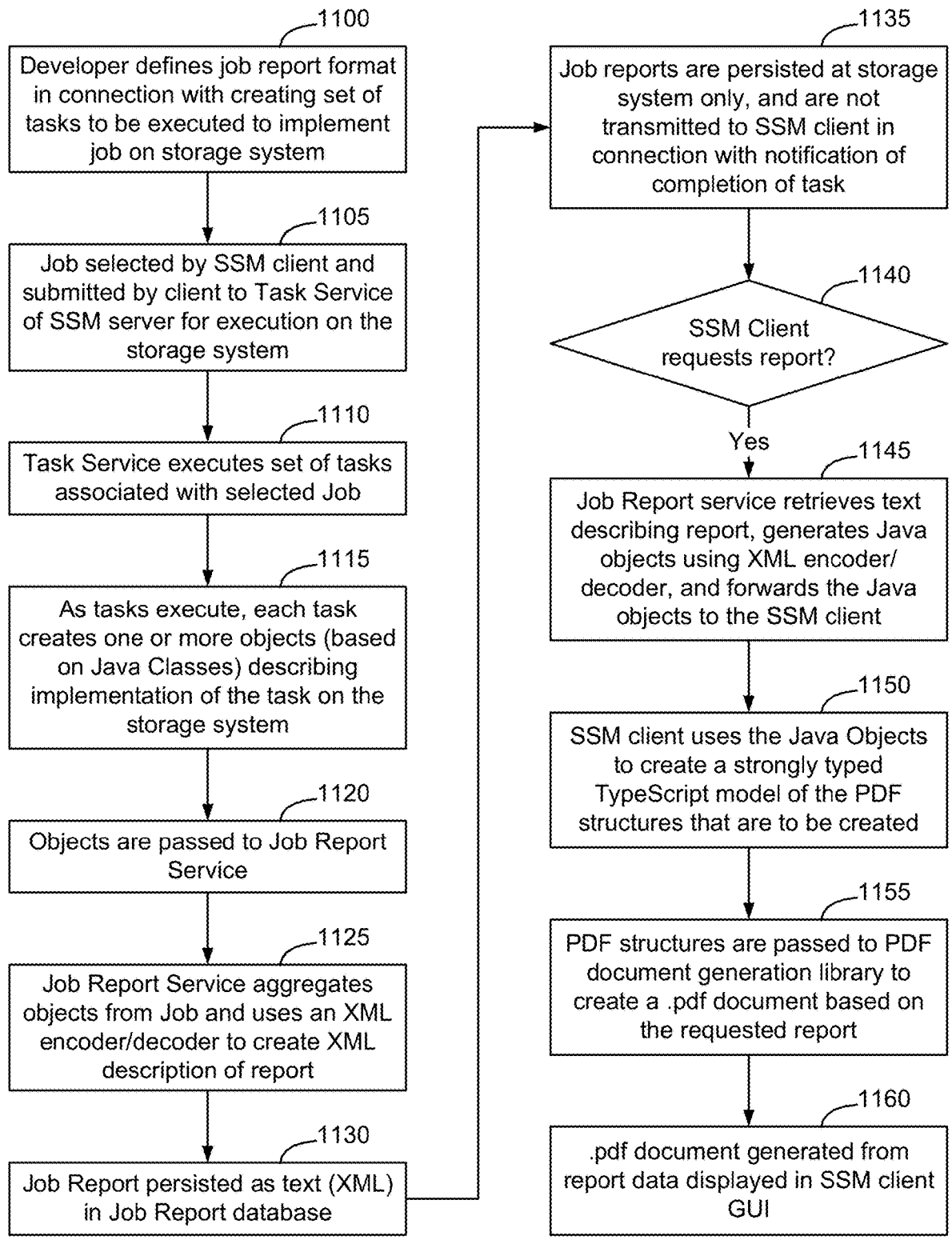
FIG. 11 is a flow chart of an example method of modeling, persisting, and presenting job reports in a storage system management application, according to some embodiments.

FIG. 11 is a flow chart of an example method of modeling, persisting, and presenting job reports in a storage system management application, according to some embodiments. As shown in FIG. 11, during development of a feature or application that will be implemented as a set of tasks on a storage system, a developer will define a job report format (block 1100). The job report format will include the job report model specifying to the tasks what type of job report objects should be created in connection with execution of the set of tasks associated with the job.

At a later time, the job is selected by the storage system management client and submitted by the client to the task service of the storage system management server for execution on the storage system (block 1105). The task service executes the set of tasks associated with the selected job (block 1110) on the storage system. As the tasks execute, at least some of the tasks create one or more job report objects 340 (based on Java Classes) describing implementation of the task on the storage system (block 1115).

The job report objects 340 that are created are passed to the job report service 370 (block 1120). The job report service 370 aggregates the job report objects 340 and uses an XML encoder/decoder to create corresponding XML objects (block 1125) that are persisted as text (XML) in a job report database (block 1130). As noted in FIG. 11, in some embodiments the job records 360 are persisted at the job report service 370, and are not transmitted to the storage system management client 200 until requested by the storage system management client 200 (block 1135).

By separating the reports from the jobs, it becomes possible for the reports to be retrieved independently and on demand, which improves performance when transporting collections of jobs from the storage system management server to the storage system management client. Since reports are not automatically downloaded to the storage system management client, it is possible to reduce bandwidth consumption by not transporting potentially large reports that the user may not be interested in viewing. This also improves application performance when searching or iterating through jobs.

A determination is then made as to whether one of the storage system management clients 200 has requested a report from the report service 370 (block 1140). If a report is requested (a determination of YES at block 1140), the job report service 370 retrieves the text describing the report, uses the XML encoder/decoder 365 to generate corresponding Java objects, and forwards the Java objects associated with the report 1000 to the storage system management client 200 (block 1145).

The storage system management client 200 converts the generically formatted data 1000 into a strongly typed TypeScript model of the .pdf structures 1020 that are to be created for input to the .pdf generator (block 1150). The .pdf structures are then used to generate corresponding untyped JavaScript .pdf structures 1030.

The .pdf structures 1030 are passed to a .pdf document generation library that uses the .pdf structures 1030 to create a .pdf document 1040 corresponding to the job report model (block 1155). The .pdf document that was generated is then able to be displayed, for example, using the storage system management client 200 graphical user interface (block 1160).

Although an implementation was described in which job report objects 340 are converted into a .pdf document, a similar process could also be used to generate word documents, excel documents, or documents having other formats. Specifically, although some embodiments are configured to implement the following object conversion process:

Java Objects→XML→Java Objects→Internal .pdf model→pdf generator objects→.pdf document, a similar object conversion process could likewise be used to create a word or excel documents:

Java Object→XML→Java Objects→Internal document model→document generator objects→document Java Object→XML→Java Objects→Internal excel model→excel generator objects→excel document.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A system for modeling, persisting, and presenting job reports as documents in a storage system management application, comprising:
   one or more processors and one or more storage devices storing instructions that are operable, when executed by the one or more processors, to cause the one or more processors to perform operations comprising:
   receiving job report objects from task executors associated with implementation of a job on a storage system, the job report objects containing job report data associated with implementation of the job on the storage system;
   receiving a job report model object associated with the job report objects, the job report model object defining the type of job report objects that are included in a job report document, and specifying a layout of the job report document and how the job report objects are organized to create the job report document from the job report objects;
   collecting the job report objects and the job report model object into a job record;
   using an Extensible Markup Language (XML) encoder/decoder to generate a set of XML objects corresponding to the job report objects and to the job report model object, the XML objects being formatted in text;
   persisting the set of XML objects of the job record in a job report database;
   receiving a request for a particular job report;
   retrieving the job record identified by the particular job report;
   retrieving the set of XML objects of the job record from the job report database;
   using the XML encoder/decoder to re-create the set of job report objects and the job report model object from the set of retrieved XML objects;
   converting the set of job report objects into a corresponding set of strongly typed TypeScript objects;
   using the TypeScript objects to generate a corresponding set of untyped objects to be input to a document generator;
   using the untyped objects and the job report model object, by the document generator, to create a document; and
   returning the created document in response to the request for the particular job report.

2. The system of claim 1, wherein the job report objects are Java objects based on a set of Java classes.

3. The system of claim 1, wherein the untyped objects are JavaScript objects.

4. The system of claim 1, wherein the document generator is a .pdf document generator, and wherein the document is a .pdf document.

5. The system of claim 1, wherein the document generator is a word document generator, and wherein the document is a word document.

6. The system of claim 1, wherein the document generator is a spreadsheet generator, and wherein the document is a spreadsheet.

7. The system of claim 1, further comprising generating the job report objects by the task executors.

8. A method of modeling, persisting, and presenting job reports as documents in a storage system management application, comprising the steps of:
   generating job report objects by task executors associated with implementation of a job on a storage system, the job report objects containing job report data associated with implementation of the job on the storage system;
   forwarding the job report objects from the task executors to a job report service;
   receiving job report objects by the job report service from the task executors;
   receiving a job report model object associated with the job report objects by the job report service, the job report model object defining the type of job report objects that are included in a job report document, and specifying a layout of the job report document and how the job report objects are organized to create the job report document from the job report objects;
   collecting the job report objects and the job report model object into a job record;
   converting the job report objects and the job report model object, by the job report service using an XML encoder/decoder, into a set of Extensible Markup Language (XML) objects, the XML objects being formatted in text;
   persisting, by the job report service, the set of XML objects as a job record in a job report database;
   receiving a request for creation of a .pdf document from a particular job report;

retrieving, by the job report service, the set of XML objects of the job record identified by the particular job report from the job report database;

converting the set of XML objects, by the job report service using the XML encoder/decoder, to recreate the original job report objects and the job report model object; and converting the set of job report objects into a corresponding set of strongly typed TypeScript objects;

using the TypeScript objects to generate a corresponding set of untyped objects to be input to a document generator;

using the untyped objects and the job report model object, by a .pdf generator, to create a .pdf document for presentation in the storage system management application; and returning the created .pdf document in response to the request for the particular job report.

9. The method of claim 8, wherein the step of retrieving the set of XML objects is only implemented by the job report service in response to a request for creation of the .pdf document.

10. The method of claim 8, wherein the job report objects are Java objects based on a set of Java classes.

\* \* \* \* \*